United States Patent [19]

Flinth et al.

[11] 3,736,998

[45] June 5, 1973

[54] DEVICE FOR APPLICATION OF FORCE

[75] Inventors: Rune Nils Allan Flinth; Kjell Helge Nordstrom, both of Vasteras, Sweden

[73] Assignee: Safelink AB, Vasteras, Sweden

[22] Filed: Apr. 20, 1971

[21] Appl. No.: 135,622

[30] Foreign Application Priority Data

May 5, 1970 Sweden ..............................6168/70

[52] U.S. Cl.................................177/187, 177/255
[51] Int. Cl. ............................................G01g 21/10
[58] Field of Search......177/208–211, 255, 187–189; 73/141 A

[56] References Cited

UNITED STATES PATENTS

| | | | |
|---|---|---|---|
| 3,407,891 | 10/1968 | Weigand | 177/255 |
| 3,237,450 | 3/1966 | Brooks | 73/141 A |
| 3,512,595 | 5/1970 | Laimins | 177/211 X |
| 2,472,047 | 5/1949 | Ruge | 73/141 A |
| 2,866,333 | 12/1958 | Dudenhausen | 73/141 A |
| 3,587,761 | 6/1971 | Merriam et al. | 177/255 X |

FOREIGN PATENTS OR APPLICATIONS

| | | | |
|---|---|---|---|
| 225,209 | 2/1969 | Sweden | 177/211 |
| 582,406 | 9/1959 | Canada | 73/141 A |
| 645,845 | 11/1950 | Great Britain | 73/141 A |

*Primary Examiner*—George H. Miller, Jr.
*Attorney*—Yount & Tarolli

[57] ABSTRACT

A device or adaptor for transmitting force between load supporting structure and a load cell including a first member which rests on the load cell and a second member connected to the load supporting structure with the two members being interconnected by at least three force transmitting elements such that side loading forces applied to the load supporting surface permits the two members to move relative to each other thereby to isolate the load cell from the side loading. Upon removal of the side loading the two members automatically return to their original positions. Provision is also made to compensate for shock loads or overloads through the use of resilient elements incorporated in the device.

22 Claims, 22 Drawing Figures

Patented June 5, 1973 3,736,998

DEVICE FOR APPLICATION OF FORCE

This invention relates to a device for applying forces from a load carrier to various types of load sensing means such as load cells.

Although the invention will be described with particular reference to weighing scales such as platform scales, it will be appreciated that the invention has broader application and may be employed with other types of scales such as container scales, crane scales, roller conveyor scales and trucks or hoppers with built-in scales as well as in any other application in which load cells are used as the weight/force sensing device.

The desirability of minimizing side loading on a load cell has long been recognized and various approaches have been tried to achieve that end. For example, it is known that the influence from side loads on a load cell can be decreased by the use of roller or ball bearing units or sliding plates with a low coefficient of friction between the load cell and the load supporting surface or between the load cell and the foundation on which it rests. Another approach would be to apply a spherical support at both ends of the load cell so that the load cell can tilt when subjected to the side loading; however, in certain applications, due to, for example, temperature expansion of the load carrier, the angular displacement of the load cell becomes so great that the measuring accuracy of the cell is affected and the force that the load cell measures is not a true indicator of the actual load. The same problem arises when the load carrier is supported in a tension transducer.

In the prior art arrangements, the load supporting surface or member is usally attached to the supporting foundation by various means such as horizontally arranged flexure members, stay rods or links or vertically arranged bearings such as ball bearings, guides and so forth, all of which are intended to withstand the side loads. However, since side loading may result from various conditions and may vary widely in magnitude, these prior art arrangements, of necessity, have been constructed to withstand a wide range of side loads. As a result, the bending forces and/or friction losses inherent in these arrangements have had a material influence on the load sensing characteristics of the load cell.

Moreover, the deflection of prior art arrangements such as flexure members or stay rods, has not been constant but rather, exhibits non-linear characteristics depending on several factors. For example, a differential in deflection may result from varying the location of a given load on the load supporting surface. Moreover, where the load sensing device is incorporated in a mobile unit such as a truck, the surface on which the load is supported may be uneven and the frame of the truck may be twisted thereby affecting the position of the points of attachment of the flexure members in the vertical plane. Variations such as these cause a non-linear variation of the load losses and an erroneous indication by the scale system.

Another substantial problem incurred where flexure members are employed is the difficult and time consuming task of mounting the members in an absolutely horizontal plane. If any one of the members deviate from the horizontal by even a small amount, this deviation immediately affects the entire system.

A further approach that has been employed by the prior art is to place a rubber or resilient element between the load supporting member and the load cell with the rubber element being, to some extent, elastic in the horizontal direction whereby side deflection of the load supporting member is absorbed by shear deformation in the rubber element. Horizontal movement is limited by stops in the foundation. One disadvantage of using a rubber element is that it inherently deflects under loads and in many applications this can not be tolerated. Moreover, applications in which rubber elements may be used are limited by the fact that, to increase the shear deformation, the element must be made of a softer rubber which, in turn, increases the deflection of the element in the load direction. As a result, from a practical point of view, only rubber elements which deflect under a relatively high shear loading can be utilized thereby limiting this arrangement to a very few types of load cells which can accept large side loads during the weighing operation.

It is the principal object of this invention to provide an improved device for the application of force from a load supporting surface to a load cell and which overcomes the aforementioned problems.

It is a more specific object of this invention to provide a device for use in force or load measuring systems which eliminates undesirable side loads on the load cells.

Still another object of the invention is to provide a load sensing system which includes resilient means for eliminating the adverse affects of shock loads or overloads in the measuring direction.

In accordance with the principles of this invention, the force applying device comprises a force applying member, a force receiving member, and force transmitting elements connecting the two members. The force receiving member is adapted to rest on a load cell and swingably support the force applying member by the force transmitting elements. The force transmitting elements are so dimensioned and arranged that, upon application of side loads on the force applying member it is free to move with respect to the force receiving member and the load cell thereby substantially isolating the load cell from the side loading. When the side load is removed, the force applying member automatically returns to its original position. In addition, spring elements deflectable in the measuring direction may be incorporated in the device so that adverse affects from shock loads and overload conditions in the measuring direction can be eliminated.

More specifically, and in accordance with one specific embodiment of the invention, the force applying device may be incorporated in a platform scale with the platform supported on four force applying devices and four load cells. The load supporting member or platform is supported on the force applying members and is therefore free to move in all directions. Side loading, whether from dynamic forces or from expansion or contraction due to temperature variations, which cause movement of the platform and the force applying members, is substantially isolated from the load cell by the shifting, swinging movement of the force applying members relative to the force receiving members. When the side loading has ceased, each of the force applying devices centers the load supporting member whereby undisturbed weighing of the load may be obtained.

One particular advantage of the invention is that the system accuracy of an electronic scale in which the force applying devices are incorporated will be determined only by the accuracy of the units themselves and will not be affected by errors in the installation process. This makes it possible to construct and test the scale system at the factory and make such final calibrations or adjustments as may be required, after which the complete scale can be disassembled and reconstructed on site without the need for further tests or calibration. As a result, installation time and costs are reduced and the need for specialists at the construction site is eliminated.

A further significant advantage of the device is its ability to withstand temperature variations without affecting the accuracy of the load cell or the weighing system.

Additional advantages, among others, of the force applying device and the system using such a device are the compact design, low manufacturing cost and ease of installation obtainable.

Referring now to the drawings wherein like reference numerals indicate like parts in the various views.

Figure 15:
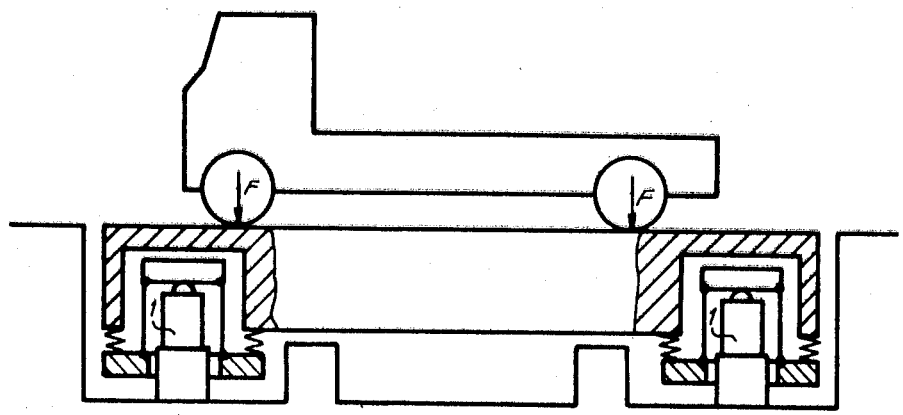
Figure 16:
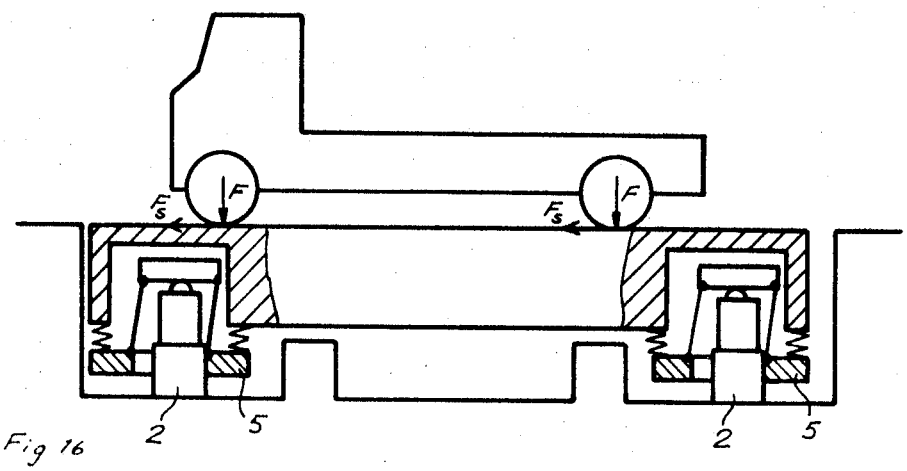
Figure 17:
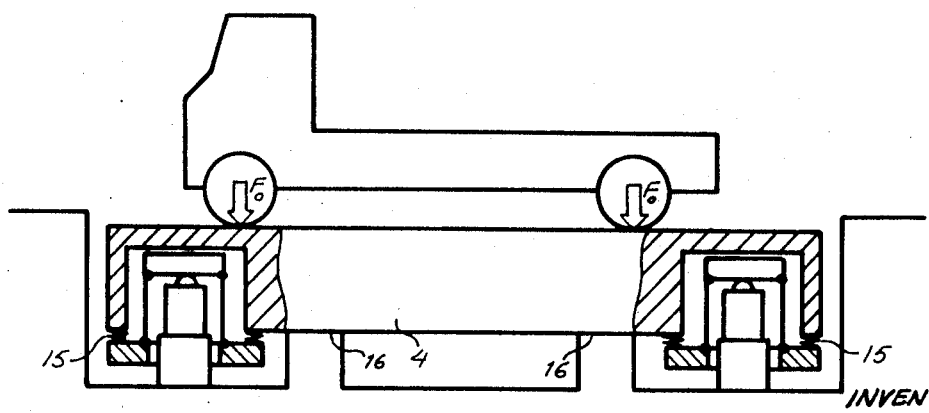

FIGS. 10 through 14 schematically illustrate various arrangements of resilient elements which may be incorporated in the device for overload protection;

FIGS. 15, 16 and 17 are schematic illustrations of the force applying devices as they may be installed in a platform scale and illustrate a normal weighing condition, a side load condition and an overload condition, respectively.

Figure 1:
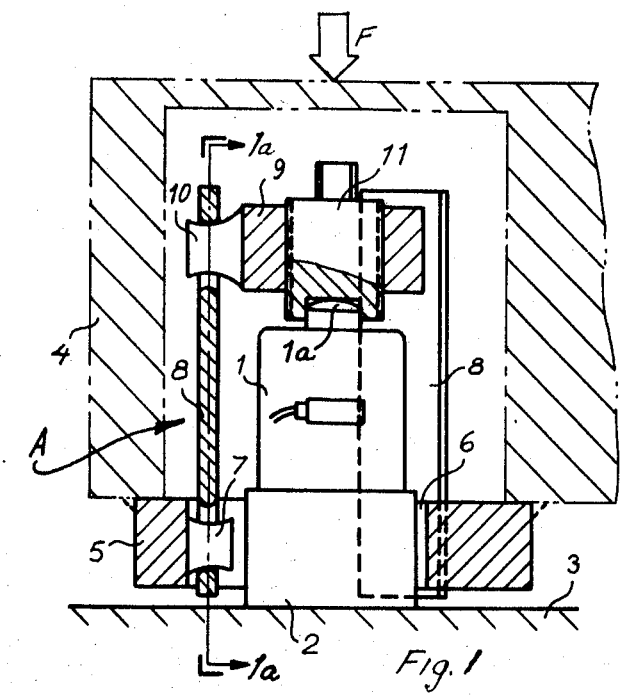
FIG. 1 is a sectional view through a force applying device or adapter constructed in accordance with the principles of this invention.

Referring now in detail to the drawings, FIG. 1 illustrates a force applying device or adapter constructed in accordance wit the principles of this invention and indicated generally by the reference A. The force applying device is illustrated in combination with a load cell 1 mounted on a base 2 which, in turn, is supported on a foundation 3. As shown, the load cell 1 and the force applying device A are received in a recess in a load supporting member or carrier 4 on which the force F which is to be measured is applied.

The load cell 1 may be any conventional load cell, the details of which form no part of this invention.

Referring now to the force applying device or adapter A, there is provided a force applying member or plate 5 which, as shown in FIG. 1, is attached to the lower surface of the load supporting member 4. The force applying member 5 has a central opening 6 which permits it to be assembled with the load cell 1 in the opening. Equally spaced around the periphery of the opening 6 are three pins 7 which are carried by the force applying member 5 and which project radially into the opening 6.

Associated with each pin 7 is a force transmitting element or link 8. These force transmitting elements have apertures 8a at their lower ends in which the pins 7 are received. The links 8 also have openings 8b in their upper ends in which pins 10 carried by a horizontal force receiving member or plate 9 are received. The force receiving member 9 is supported in its horizontal position on a spherical load application point 1a of the load cell 1, and is centered on the load cell by a recess in the bottom of a center screw 11.

Figures 4, 4A:
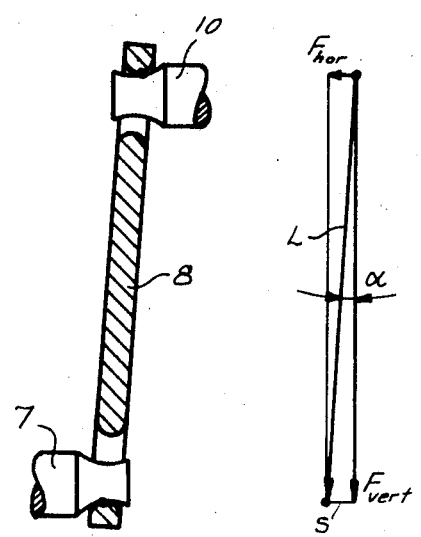
FIG. 4 illustrates the displacement of the force transmitting elements under side loading and FIG. 4a is a force diagram illustrating the relatively small component of the side load transmitted by the force transmitting element of FIG. 4.

It is to be noted that each of the openings 8a, 8b has a diameter which is larger than the diameter of the corresponding pins 7, 10 so that a substantially frictionless joint is established between each link 8 and its associated pins. In addition, the pins 7, 10 are generally cylindrical in configuration with a concave axial cross section and the periphery of the openings 8a, 8b are beveled or rounded so that the contact surface of the link rolls in a substantially frictionless manner on the contacting surface of the pin upon shifting movement of the link as shown in FIG. 4.

Figure 1A:
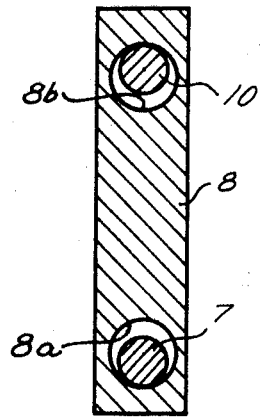
FIG. 1a is a sectional view taken along line 1a—1a of FIG. 1.
Figure 1B:
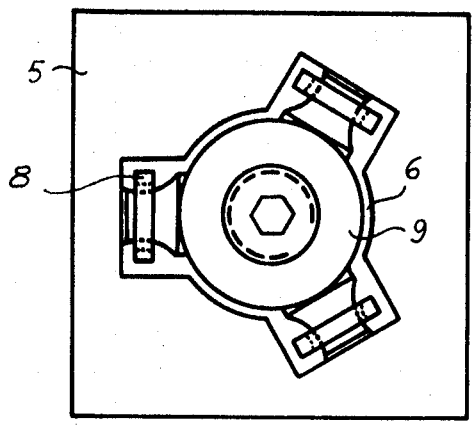
FIG. 1b is a top plan view of the force applying device of FIG. 1.

The centering screw 11, being threadedly received in the force receiving member 9, allows a simple adjustment to vary the position of the force receiving member 9 and thereby position the pins 7 and 10 in their respective openings in links 8 in the manner as shown in FIG. 1a. In this position, the load supporting member 4 is supported on the load application point 1a of load cell 1.

Figure 2A:
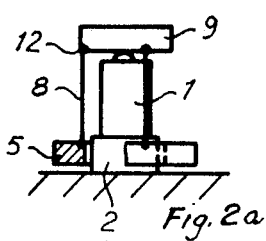
FIGS. 2, 2a, 3 and 3a are schematic illustrations of the manner in which side loads are accommodated by the device.
Figure 2:
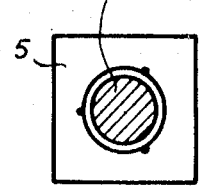

FIGS. 2 and 2a illustrate the position of the elements comprising the force applying device when the device is in its normal weighing position. As there shown, the force applying member 5 is centered with respect to the load cell 1 and the links 8 are in a substantially vertical position parallel to the measuring direction of the load cell so that the force F applied to carrier 4 will be transmitted to the load cell in the desired measuring direction.

Figure 3A:
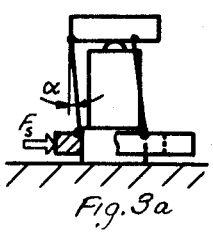
Figure 3:
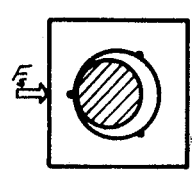

In FIGS. 3 and 3a the condition of the force applying device when it is subjected to a side load $F_s$ is illustrated. It will be noted that the force applying member 5 has moved sideways to a position where it contacts the base 2 of the load cell 1 and the links 8 have been displaced by an angle $\alpha$ from the vertical position which they had occupied in FIG. 2a. The magnitude of the side loading that is transmitted to the load cell by the side load $F_s$ is dependent on the slope or angle of the links 8 and therefore can be controlled to an acceptable value by selecting the appropriate clearance which the opening 6 in the force receiving member 5 has with respect to the base 2, and the length of the links 8. This relationship is illustrated in the force diagram shown in FIG. 4a. The maximum side load $F_{hor}$ to which the load cells may be subjected may be calculated as follows:

$F_{hor} = (F_{vert}) (\tan\alpha)$

Since, for small angles, $\tan\alpha$ is approximately equal to $\sin\alpha$, the relationship may be expressed as:

$F_{hor} = (F_{vert}) (\sin\alpha) = (F_{vert}) (S/L)$ where S is maximum possible horizontal movement, and L is effective length of the link.

It will be apparent that, by establishing the maximum permissible side load for the load cell, the length of links 8 and the size of opening 6 may be selected to assure that the value of $F_{hor}$ does not exceed the desired value. Side loads which would exceed the permissible level are prevented by the blocking engagement of member 5 against base 2.

When the side load force $F_s$ is removed, the force applying member 5 will automatically, through the force of gravity, swing back to the centered weighing position shown in FIG. 2a.

Figures 5, 6, 7, 8, 9:
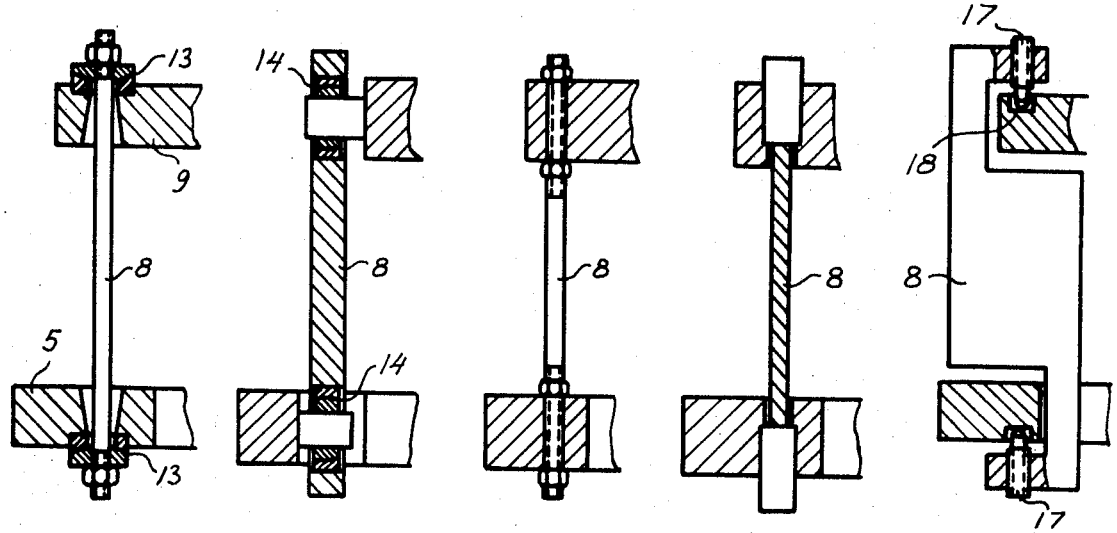
FIGS. 5 through 9 illustrate alternative forms of force transmitting elements which may be utilized in the force applying device.

It is to be understood that, in the position shown in FIGS. 3 and 3a, the load sensed by the load cell may not be an accurate indication of the force F due to the frictional forces resulting from the frictional engagement of member 6 with base 2 and which act in the measuring direction. However, it is to be noted that the device is effective in all positions except the extreme position shown in FIG. 3. For example, temperature variations may cause member 5 to shift to a position eccentric to load cell 1 and remain in that position for an interim period. However, so long as member 5 is spaced from base 2, the device will be operative to sense the magnitude of the force F. force elm elements The force transmitting elements or links shown in the embodiment of FIG. 1 are merely exemplary of the force transmitting elements that may be used. Other suitable force transmitting elements 8 are shown in FIGS. 5 through 9. FIG. 5 shows the use of a cylindrical bar which is connected at its opposite ends to spherical axial bearings 13 which permit the relative movement of the members 5 and 9. FIG. 6 shows a design in which pins similar to the pins 7 and 10 of FIG. 1 are employed but in which spherical radial bearings 14 are used to accommodate the shifting movement. FIG. 7 illustrates force transmitting elements in the form of metal rods which are fixedly attached to the members 5 and 9 with the fore transmitting elements being deformable such that when the member 5 moves relative to the member 9, the force transmitting elements 8 are elastically deformed to a generally s-shaped configuration. With this arrangement, the return of the force applying member 5 to its centered position is, in addition to gravitational forces, assisted by the elastic nature of the deformation of the elements 8. With the embodiment of FIG. 7, the magnitude of this additional centering force can be chosen by varying the length and diameter of the force transmitting elements 8.

FIG. 8 illustrates the use of a steel cable or rope which is attached at either end to the members 5 and 9. The low resistance to bending of the cable makes the arrangement of FIG. 8 much more susceptible to deflection under side loading than, for example, the design shown in FIG. 7.

FIG. 9 illustrates a still further modified form of force transmitting elements and comprises links supporting at either end adjustable screws 17 having spherical contact points which are received in recessed surfaces 18 of both the members 5 and 9. By adjusting the threaded screws 17 the effective length of the links may be varied.

Each of the arrangements shown in the embodiments of FIGS. 1 and 5 through 9 provides a means for controlling the adverse effects of side loading on the load cell 1. In addition, it frequently is desirable to provide protection for the load cell against overloading in the measuring direction. There is illustrated in FIGS. 10, 11 and 12 three alternative means of providing such overload protection.

Figures 10, 11, 12:
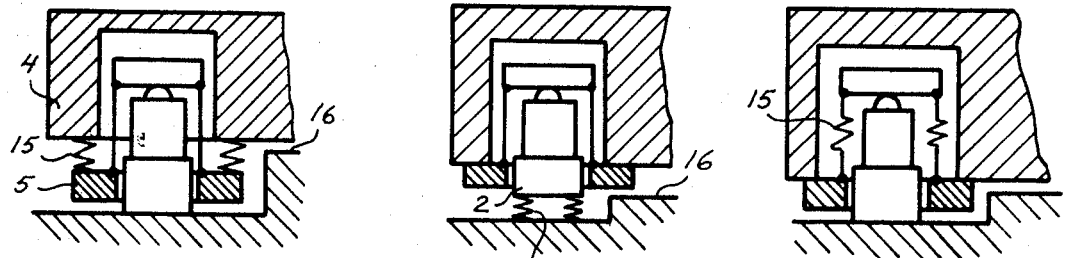

In FIG. 10 a resilient element 15 which, for example, may be a rubber element, a pre-stressed spring or other non-linear compressible member, is interposed between the load supporting member 4 and the force applying member 5. In addition, a stop 16 is positioned to be engaged by the load supporting member 4 in an extreme position of its path of travel in the measuring direction. With this arrangement, the magnitude of the load imposed on the load cell 1 can be controlled by the deflection of the resilient element 15 and the presence of the stop 16. During normal operation, the load on the load supporting member 4 would be transferred through the resilient element 15 to the force applying member 5. However, upon the presence of an overload sufficient in magnitude to cause non-linear compression of the resilient member 15, the load carrying member 4 would move downward into engagement with the stop 16 which, in turn, would support the load supporting member 4 and isolate the load cell from any further loading.

In FIG. 11, the resilient or spring element 15 has been positioned beneath the base 2 of the load cell 1. During normal operation of the embodiment of FIG. 11, the resilient element 15 would function as a substantially rigid support but upon the presence of an overload, the resilient element 15 would be compressed and the entire assembly would move downward until the force applying member 5 rests on the stop 16.

In FIG. 12 the resilient element has been incorporated in the force transmitting elements 8. During normal operation of this embodiment, the force transmitting elements 8 function as a substantially rigid link but upon the presence of an overload would deflect thereby enabling the load supporting member 4 to move down into engagement with the stop 16.

Figure 13:
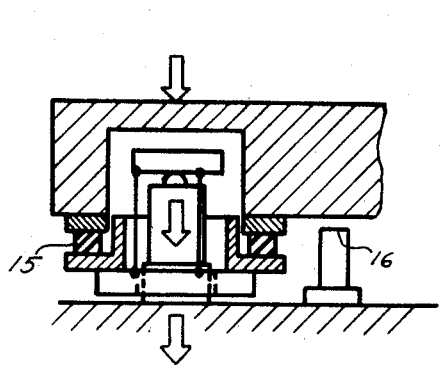
Figure 14:
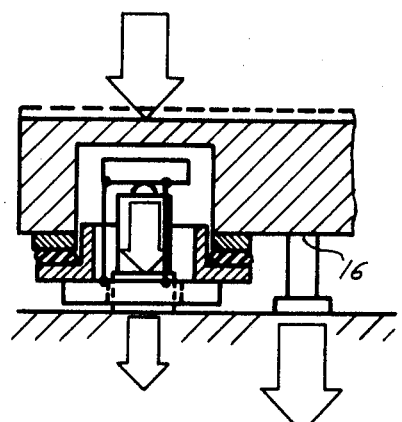

The operation of the overload protection unit is schematically illustrated in FIGS. 13 and 14. In FIG. 13 the load on the load supporting member 4 is within acceptable limits and the resilient member 15 is just slightly compressed so that the entire force is transmitted to the load cell 1. However, in FIG. 14 an overload condition is illustrated which has caused further compression of the resilient member 15 and downward movement of the load carrying member 4 into engagement with the stop 16. It is to be understood that although an overload force is applied to the load supporting member 4, the load transmitted to load cell 1 is within acceptable limits since the excess load is dissipated in compressing the resilient member 15 and moving the load carrier 4 down into engagement with the stop 16. Thereafter, the load and the load supporting member 4 are supported by the stop 16 until the overload is removed whereupon the resilient elements 15 would expand back to the position shown in FIG. 13.

Referring now to FIGS. 15 through 17, a specific application of the force applying devices heretofore described is illustrated in a truck or platform scale and wherein the platform is supported on the load cells by devices of the type illustrated in FIGS. 10 and 13. In FIG. 15 the scale is in the normal weighing position and all forces are transmitted to the load cells in a normal load measuring direction. FIG. 16 illustrates the condition of an external side load $F_s$ being imposed on the scale. The side loading may be caused, for example, by braking of the truck on the scale. As described above, the side loading forces shift the force applying members 5 for each of the force applying devices laterally whereby at least one member 5 assures an eccentric position in engagement with the base 2 of its associated load cell 1. By the above described angular displacement of the force transmitting elements 8, the magnitude of the side loads transmitted to the load cells has been controlled to an acceptable small value. When the side load force $F_s$ has ceased to act, the gravitational forces acting on the force applying members 5 cause them to return automatically to their original positions.

FIG. 17 illustrates an overload condition imposed by an overload force $F_o$. In this condition, the load $F_o$, is causing the resilient element 15 to be compressed and the entire load supporting platform 4 to move downward until it rests on the stops 16. After the overload has been removed, the expansion of the resilient elements 15 returns the scale back to the position shown in FIG. 15.

Each of the above-described embodiments of the force applying device utilizes three force transmitting elements 8 and this is the preferred arrangement. With three force transmitting members, there is the advantage that the load distribution between the three members is statically defined. Moreover, eccentric loading of the load cell is eliminated even upon side loading due to the parallel shifting motion of the force applying members 5. With fewer than three force transmitting elements, the desired parallel motion is not assured and with more than three force transmitting members the load distribution between the members is not statically defined. Nonetheless, in some applications, it may be permissible to vary the number of the force transmitting elements.

While certain specific embodiments of the invention have been described and illustrated, it is not intended that the illustrated embodiments or the terminology employed in describing them is to be limiting; rather, it is intended to be limited only by the scope of the appended claims.

What is claimed is:
1. A load sensing system comprising,
a load cell operative to sense loads applied in a load measuring direction,
a load carrier,
a force applying member resting on and supported only by said load cell for applying forces to said load cell,
a plurality of elongated force transmitting elements each having a longitudinal axis extending generally parallel to said load measuring direction, said force transmitting elements supporting and operatively connecting said load carrier to said force applying member for transmitting the loads on said load carrier to said load cell in said measuring direction,
means for permitting swinging movement of said force transmitting elements relative to said load cell and movement of said load carrier in a direction generally transverse to said load measuring direction, and stop means for restricting the range of movement of said load carrier in said transverse direction.

2. The load sensing system of claim 1 and further including resilient means operatively associated with said load carrier and deflectable in said load measuring direction continuously or when the loads on said load carrier exceed a predetermined level, and additional stop means for restricting the range of movement of said load carrier in said load measuring direction.

3. The load sensing system of claim 1 wherein said force member comprises,
a plate member supported on said load cell,
said plurality of elongated force transmitting elements each being connected at one end to said plate member, and
means operatively connecting the other ends of said elements to said load carrier,
at least portions of said elements being movable relative to said plate member as the load carrier moves in said transverse direction.

4. The load sensing system of claim 1 wherein said force member comprises a first plate member supported on said load cell,
said load carrier comprising a second plate member with said first and second members lying in generally parallel spaced planes and which extend generally transverse to said load measuring direction,
said plurality of elongated force transmitting elements extending between said first and second members, and
said means for permitting swinging movement includes means interconnecting each of said elements with said first and second members whereby said second member is shiftable in said transverse direction.

5. The system of claim 4 wherein said means interconnecting said elements with said members comprises pin means on each of said members and apertures in said elements in which said pin means are received.

6. The load sensing system of claim 4 wherein said transmitting elements comprise steel cables.

7. The load sensing system of claim 4 wherein said transmitting elements comprise elongated rods fixedly attached to said members,
each of said rods having length and thickness such that the rods are relatively readily elastically deformable transverse to the longitudinal axis thereof.

8. The load sensing system of claim 4 wherein said transmitting elements include oppositely directed spherical screw points in bearing engagement with said members.

9. The load sensing system of claim 4 wherein one of said members includes means for adjustably varying the distance between said members.

10. The system of claim 4 and further including a base supporting said load cell,
said second member having a central opening formed therein with said base being positioned in said central opening,
said central opening being of a dimension such that the walls thereof are spaced from said base.

11. The system of claim 4 wherein said second member includes a central opening formed therein,
said stop means being positioned in said opening and spaced from the walls thereof,
the clearance defined by the space between said stop means and the walls of the opening and the length of said transmission elements being selected to permit said second member to shift transverse to said load measuring direction into engagement with said stop means while the transverse component of the load transmitted by said elements to said first member is within a predetermined limit.

12. The system of claim 4 wherein said plurality of transmitting elements comprises three elements spaced around said load cell.

13. The system of claim 4 wherein said interconnecting means comprises a pivotable connection between said members and said elements.

14. The load sensing system of claim 13 wherein said connecting means for said transmitting elements comprises pivotable bearing means.

15. The load sensing system of claim 4 and further including resilient means operatively associated with said load carrier and deflectable in said load measuring direction continuously or when the loads on said load carrier exceed a predetermined level, and
additional stop means for restricting the range of movement of said load carrier in said load measuring direction.

16. The system of claim 15 wherein said load carrier further comprises a load carrying platform and wherein said resilient means is positioned between said second member and said load carrying platform.

17. The system of claim 15 wherein said resilient means is positioned to support said load cell.

18. The system of claim 15 wherein said elements include said resilient means.

19. A load cell adapter for use in a weighing system of the type having a load carrier such as a weigh platform or the like and in which the load carrier is supported on a plurality of spaced apart load cells of the type having a load application point to which loads are applied in a load measuring direction, said adapter comprising;
a first member adapted to engage the load application point of a load cell,
a second member adapted to be operatively associated with the load carrier,
at least three elongated force transmitting elements each having a longitudinal axis generally parallel to the load measuring direction,
means connecting said first member to said force transmitting elements, and
means connecting said second member to said force transmitting elements,
said force transmitting elements and said connection means being adapted to cooperate to permit movement of said force transmitting elements and one of said members relative to the other member in a direction generally transverse to the load measuring direction whereby the load cell adapter associated with a load cell in a weighing system is operative to permit shifting movement of the load carrier transverse to the load measuring direction without imposing harmful side loads on the load cell and to automatically return the load carrier to a centered position.

20. A load sensing system comprising,
base means,
a load carrier,
a plurality of load cells supported on said base means and each being operative to sense loads applied in a load measuring direction, and adapter means associated with each of said load cells and supporting said load carrier on said load cells,
each of said adapter means including:
a first member in engagement with said load cell,
a second member spaced in the measuring direction from said first member and lying in a plane generally parallel to said first member,
a plurality of elongated force transmitting elements connected to said members with the longitudinal axis of each of said force transmitting elements being generally parallel to said loading measuring direction,
the engagement with said load cell and the connection with said force transmitting elements providing the sole support for said first member,
said force transmitting elements being operative to permit swinging movement of one of said members relative to the other of said members while maintaining the generally parallel relationship of said members whereby said load carrier may move in directions generally transverse to said load measuring direction as transverse forces are applied to said load carrier without imposing harmful side loads on said load cell with said adapter means being operative to automatically return said load carrier to be centered weighing position when the transverse forces acting on said load carrier disappear.

21. A load sensing system of the type having a generally horizontally positioned load carrier adapted for supporting loads for weighing thereon, base means and a plurality of load sensing means supporting said load carrier at a plurality of spaced locations on said base means and operative to sense the loads on said carrier, the improvement comprising:
each of said load sensing means including:
a load cell supported on said base means operative to sense loads applied in a vertical load measuring direction;
a horizontally arranged force member resting on said load cell for applying loads to said load cell in said load measuring direction, and
means operatively connecting said force member to said load carrier for transmitting loads on said carrier to said load cell;
said connecting means including a plurality of elongated force transmitting elements each having a longitudinal axis generally parallel to said measuring direction and swingable relative to said load cell while maintaining the horizontal orientation of said force member
whereby movements of said load carrier under forces acting transverse to said load measuring direction cause said force transmitting elements to swing relative to said load cell without imposing harmful side loads on said load cell with said force transmitting elements being operative to return said load carrier to a centered position when said forces disappear.

22. The load sensing system of claim 21 wherein said connecting means further includes a second generally horizontal force member spaced from said first mentioned force member, and
pivotable connections between each of said force transmitting elements and said force members.

* * * * *